United States Patent
Lu et al.

(10) Patent No.: US 7,913,504 B2
(45) Date of Patent: *Mar. 29, 2011

(54) VARIABLE REFRIGERANT EXPANSION DEVICE WITH PRESSURE RELIEF

(75) Inventors: Jan Lu, Troy, MI (US); Harry E. Eustice, Troy, MI (US); Edwin J. Stanke, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

This patent is subject to a terminal disclaimer.

(21) Appl. No.: 12/125,085

(22) Filed: May 22, 2008

(65) Prior Publication Data

US 2009/0288436 A1  Nov. 26, 2009

(51) Int. Cl.
*F25B 41/04* (2006.01)

(52) U.S. Cl. .......................... 62/222; 236/92 B

(58) Field of Classification Search .............. 236/92 B, 236/92 C; 62/197, 222, 511; 137/12, 462
See application file for complete search history.

(56) References Cited

U.S. PATENT DOCUMENTS

| | | | |
|---|---|---|---|
| 2,594,701 A | | 4/1952 | Wolf |
| 2,841,174 A | * | 7/1958 | Frye .......................... 137/514.5 |
| 4,909,277 A | | 3/1990 | Vandiver |
| 5,251,459 A | * | 10/1993 | Grass et al. ................. 62/324.1 |
| 5,277,364 A | * | 1/1994 | Heffner et al. .............. 236/92 B |
| 5,597,117 A | * | 1/1997 | Watanabe et al. ........... 236/92 B |
| 6,334,324 B1 | * | 1/2002 | Muta et al. ...................... 62/222 |
| 6,691,924 B1 | * | 2/2004 | Vestergaard et al. ........ 236/92 B |
| 7,707,844 B2 | * | 5/2010 | Nestler et al. .................. 62/222 |
| 2009/0288434 A1 | * | 11/2009 | Lou et al. ........................ 62/222 |
| 2010/0186434 A1 | * | 7/2010 | Lou et al. ........................ 62/222 |

FOREIGN PATENT DOCUMENTS

| | | |
|---|---|---|
| EP | 1167899 A2 | 2/2002 |
| EP | 1832789 A2 | 12/2007 |
| JP | 2007178066 A | 7/2007 |

\* cited by examiner

*Primary Examiner* — Marc E Norman

(57) ABSTRACT

A refrigerant expansion assembly, and method of operation, for use in a vehicle air conditioning system is disclosed. An orifice channel connects an orifice inlet port to an orifice outlet port and includes a valve seat. A variable orifice assembly is mounted in the orifice channel and includes a fixed orifice passage extending axially through a variable orifice body having a sealing flange that can seal against a valve seat via an orifice spring. An orifice bypass valve includes a check ball biased against a ball seat by a bypass spring and selectively allows some of the refrigerant to bypass the variable orifice assembly. The refrigerant expansion assembly may also include a burst disk downstream of the variable orifice assembly.

16 Claims, 4 Drawing Sheets

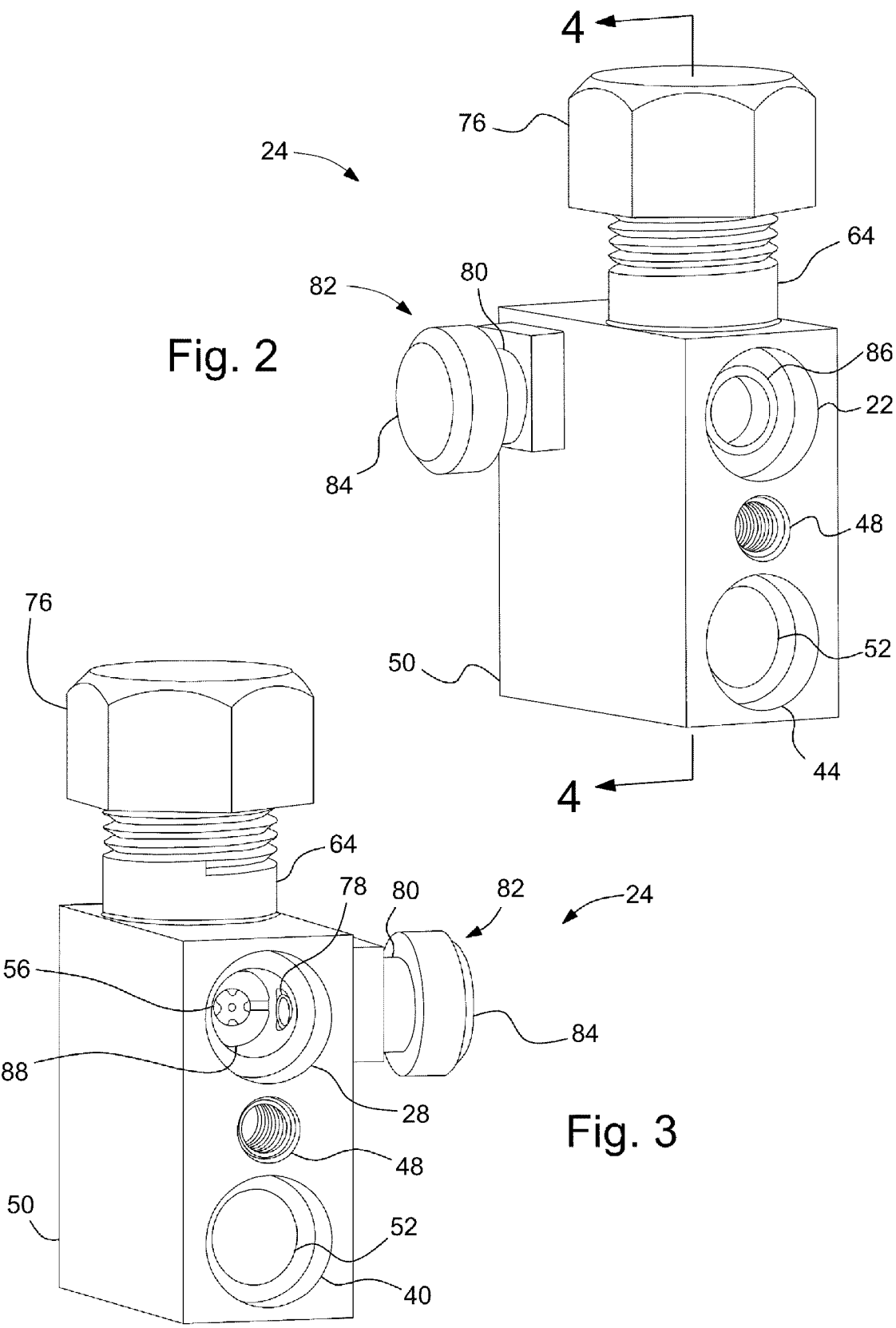

VARIABLE REFRIGERANT EXPANSION DEVICE WITH PRESSURE RELIEF

BACKGROUND OF INVENTION

The present invention relates generally to vehicle air conditioning systems and more particularly to variable refrigerant expansion devices for vehicle air conditioning systems that employ higher pressure, non-conventional refrigerants.

New regulations for refrigerants used in vehicle air conditioning systems are causing some vehicle air conditioning systems to employ refrigerants that operate at much higher pressures than conventional refrigerants used in vehicles. With these much higher pressures, the typical expansion devices used with the conventional refrigerants are not adequate. Accordingly, some have modified thermal expansion valves to operate at the higher pressures of the new refrigerants, but drawbacks exist with the diaphragm located in the thermal expansion valve between the inflow refrigerant stream and the outflow refrigerant stream and with a tube used for a temperature sensor, which is easily broken during assembly. Others have attempted to provide orifice tubes that can be used with the higher pressure refrigerants by providing a burst disk to protect an evaporator from overpressure and a bellows assembly coaxial with the orifice that is employed as a refrigerant bypass. But this orifice tube assembly is overly complex and expensive to fabricate and assemble. So it is desired to provide an expansion device capable of operating under the high pressures of newer vehicle refrigerants while providing for a relatively inexpensive and simple design that performs the desired functions.

SUMMARY OF INVENTION

An embodiment contemplates a refrigerant expansion assembly for use in a vehicle air conditioning system. The assembly may comprise an orifice inlet port configured to receive a refrigerant from a condenser, an orifice outlet port configured to send the refrigerant to an evaporator, and an orifice channel connecting the orifice inlet port to the orifice outlet port and including a valve seat. The assembly may also comprise a variable orifice assembly, mounted in the orifice channel, including a variable orifice body axially slidable in the orifice channel, with the variable orifice body including a sealing flange sealingly engageable with the valve seat, an upstream variable orifice passage extending upstream from the sealing flange, a downstream variable orifice passage extending downstream from the sealing flange and a fixed orifice passage extending axially through the variable orifice body, with the variable orifice assembly including an orifice spring configured to bias the sealing flange into engagement with the valve seat. The assembly may also comprise an upstream bypass channel extending from the orifice channel upstream from the variable orifice assembly and including a ball seat, a downstream bypass channel extending from the orifice channel downstream from the variable orifice assembly, a bypass chamber connecting the upstream bypass channel to the downstream bypass channel, a check ball mounted in the bypass chamber and sealingly engageable with the ball seat, and a bypass spring operatively engaging the check ball to bias the check ball into sealing engagement with the ball seat.

An embodiment contemplates a refrigerant expansion assembly for use in a vehicle air conditioning system. The assembly may comprise an orifice inlet port configured to receive a refrigerant from a condenser, an orifice outlet port configured to send the refrigerant to an evaporator, and an orifice channel connecting the orifice inlet port to the orifice outlet port and including a valve seat. The assembly may also comprise a variable orifice assembly, mounted in the orifice channel, including a variable orifice body axially slidable in the orifice channel, with the variable orifice body including a sealing flange sealingly engageable with the valve seat, an upstream variable orifice passage extending upstream from the sealing flange, a downstream variable orifice passage extending downstream from the sealing flange and a fixed orifice passage extending axially through the variable orifice body, with the variable orifice assembly including an orifice spring configured to bias the sealing flange into engagement with the valve seat. The assembly may also comprise a pressure relief outlet channel connecting to the orifice channel between the variable orifice assembly and the orifice outlet port, and a burst disk enclosing an end of the pressure relief outlet channel, whereby when a refrigerant pressure adjacent to the pressure relief outlet channel exceeds a predetermined pressure threshold, the burst disk will burst, allowing the refrigerant to escape to atmosphere.

An embodiment contemplates a method of operating a vehicle air conditioning system having a refrigerant expansion assembly, the method comprising the steps of: directing a refrigerant through an orifice inlet port, an orifice channel, having a fixed orifice passage through a variable orifice assembly, and an orifice outlet port prior to directing the refrigerant into an evaporator; applying a refrigerant pressure upstream of the variable orifice assembly to a check ball, against a bias of a bypass spring, and a variable orifice body of the variable orifice assembly, against a bias of an orifice spring; pushing the variable orifice body against the bias of the orifice spring into an open position when the refrigerant pressure exceeds a first predetermined pressure threshold, allowing the refrigerant to flow through an upstream variable orifice passage and a downstream variable orifice passage in the variable orifice assembly; pushing the check ball against the bias of the bypass spring into an open position when the refrigerant pressure exceeds a second predetermined pressure threshold that is a higher pressure than the first predetermined pressure threshold, allowing the refrigerant to flow past the check ball through a bypass chamber to thereby bypass the variable orifice assembly; the bypass spring biasing the check ball into a closed position when the refrigerant pressure drops below the second predetermined pressure threshold, thereby forcing all of the refrigerant to flow through the variable orifice assembly; and the orifice spring biasing the variable orifice body into a closed position when the refrigerant pressure drops below the first predetermined pressure threshold, thereby forcing all of the refrigerant to flow through the fixed orifice passage.

An advantage of an embodiment is that the refrigerant expansion assembly has both an orifice bypass valve to relieve high pressure upstream of the orifice, and a pressure relief valve that will release refrigerant pressure when the pressure is high enough that damage to the evaporator is possible—all in a relatively simple, inexpensive and reliable assembly. The pressure relief is particularly useful when employing refrigerants that operate at a higher pressure than conventional vehicle refrigerants, such as, for example, carbon dioxide refrigerant systems. The orifice bypass valve is a simple, inexpensive and reliable design for achieving the desired pressure relief.

An advantage of an embodiment is that the orifice assembly is variable, allowing for improved refrigerant flow by allowing for variable refrigerant flow through the orifice.

An advantage of an embodiment is that a refrigerant filter member is removable for service, thus reducing costs associated with assembly and servicing of a clogged filter.

An advantage of an embodiment is that the refrigerant expansion assembly includes a compact design with four parallel port connections, thus allowing for easier packaging in the vehicle.

BRIEF DESCRIPTION OF DRAWINGS

FIG. 2 is a perspective view of the refrigerant expansion assembly.

FIG. 3 is a perspective view of the refrigerant expansion assembly, viewed from a different angle than FIG. 2.

DETAILED DESCRIPTION

Figure 1:
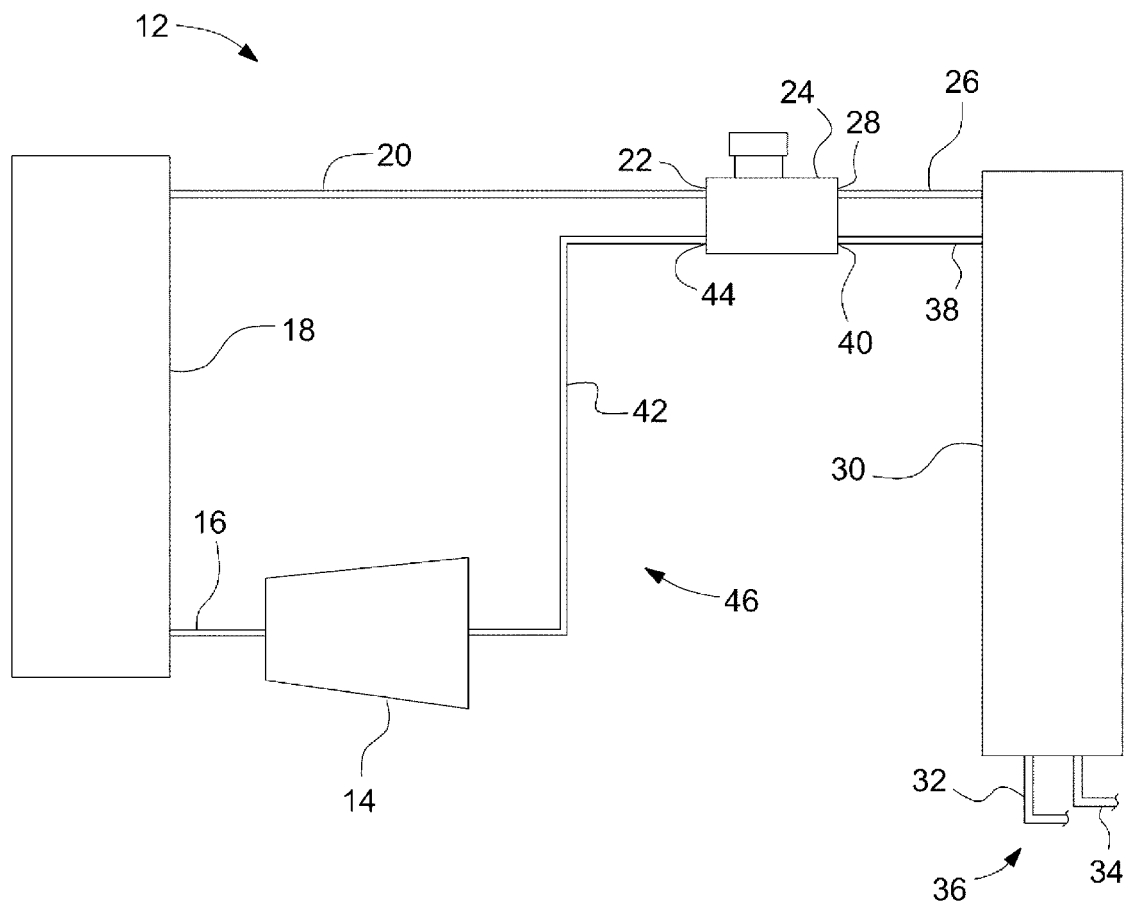
FIG. 1 is a schematic view of a vehicle air conditioning system employing a refrigerant expansion assembly.

FIG. 1 illustrates a portion of a vehicle air conditioning system 12 for use with alternative refrigerants operating at a much higher pressure than conventional refrigerants used in automotive vehicles. The high pressure refrigerant may be, for example, carbon dioxide refrigerant rather than conventional automotive refrigerants such as R134a or Freon. The air conditioning system 12 includes a refrigerant compressor 14 that compresses a refrigerant before sending it through a refrigerant line 16 to a condenser 18, where heat energy is removed from the refrigerant. Another refrigerant line 20 directs the refrigerant from the condenser 18 to an orifice inlet port 22 of a refrigerant expansion assembly 24. Still another refrigerant line 26 connects between an orifice outlet port 28 of the expansion assembly 24 and an evaporator 30.

The evaporator 30 is also sometimes referred to as a chiller and includes a secondary loop outlet line 32 and a secondary loop inlet line 34, which may carry a liquid, such as, for example, coolant, through a secondary loop 36 (only a portion of which is shown) of the air conditioning system 12. Alternatively, the evaporator 30 may act as a more conventional evaporator, without a secondary loop in the air conditioning system. In either case, another refrigerant line 38 extends from the evaporator 30 to a return inlet port 40 of the refrigerant expansion assembly 24, and another refrigerant line 42 extends from a return outlet port 44 of the expansion assembly 24 to the compressor 14 to complete a refrigerant loop 46 of the vehicle air conditioning system.

FIGS. 2-5 illustrate the refrigerant expansion assembly 24 shown in FIG. 1 in more detail. The refrigerant expansion assembly 24 has a main body 50 that defines a pair of mounting bores 48 for mounting the assembly 24.

The main body 50 also defines the orifice inlet port 22, the orifice outlet port 28, the return inlet port 40 and the return outlet port 44. The return inlet port 40 and the return outlet port 44 are coaxially aligned with each other and are connected by a refrigerant return channel 52 extending through the main body 50. The orifice inlet port 22 and the orifice outlet port 28 are coaxially aligned with each other and extend parallel to the return inlet and outlet ports 40, 44, but do not connect with or have any interaction with the return inlet and outlet ports 40, 44 (as is the case with a thermal expansion valve that has an opening between the orifice ports and the return ports that is covered with a diaphragm that is used to affect the valve opening). The orifice inlet port 22 is connected to the orifice outlet port 28 by an orifice channel 54 extending through the main body 50, with the orifice channel 54 including a variable orifice assembly 56 mounted therein.

An upstream bypass channel 58 extends perpendicular from the orifice channel 54—just upstream of the variable orifice assembly 56—to a valve seat 60 that opens into a bypass chamber 62 defined by a bypass valve flange 64 extending from the main body 50. A downstream bypass channel 66 extends from the bypass chamber 62 just downstream of the variable orifice assembly 56. An orifice bypass valve 68 includes a check ball 70, bypass piston 72 (having a stem 73) and a coil spring 74, all located in the bypass chamber 62. The check ball 70 is biased toward the valve seat 60 by the action of the coil spring 74 pressing against the bypass piston 72. The opposite end of the coil spring 74 is retained by a spring retention nut 76 that screws onto the bypass valve flange 64. Alternatively, the coil spring 74 and bypass piston 72 may be replaced by some other spring arrangement, so long as the spring arrangement biases the check ball 70 into the valve seat 60.

A pressure relief valve 82 includes a pressure relief outlet channel 78 extending from the orifice channel 54 between the variable orifice assembly 56 and the orifice outlet port 28. The pressure relief outlet channel 78 extends through a pressure relief flange 80 to a burst disk portion 84 of the pressure relief valve 82 at the end of the pressure relief flange 80.

A removable filter 86 is mounted in the orifice channel 54 adjacent to the orifice inlet port 22. The removable filter 86 extends across the orifice channel 54 so that all refrigerant flowing through the channel 54 will go through the filter 86. The removable filter 86, being adjacent to the larger diameter orifice inlet port 22, is easily removable for service or replacement.

The variable orifice assembly 56 includes a variable orifice nut 88 screwed into the orifice channel 54 and including a bore 90. The variable orifice assembly 56 also includes a variable orifice body 92 and a variable orifice spring 94. The variable orifice body 92 can telescopically slide in the bore 90 and includes a fixed orifice passage 95 extending axially therethrough that maintains continuous fluid communication between the orifice inlet port 22 and the orifice outlet port 28. The variable orifice body 92 also includes a sealing flange 96 that traps the variable orifice spring 94 between the variable orifice nut 88 and the sealing flange 96, with the spring 94 biasing the body 92 upstream into engagement with a valve seat 98 in the orifice channel 54. The variable orifice body 92 also includes upstream variable orifice passages 100 extending axially upstream of the sealing flange 96 and downstream variable orifice passages 102 extending axially downstream from the sealing flange 96.

The operation of the vehicle air conditioning system 12 and refrigerant expansion assembly 24 of FIGS. 1-5 will now be discussed. The compressor 14 is activated, compressing and pushing the refrigerant through the system 12. Air flowing through the condenser 18 absorbs heat from the refrigerant before it flows into the expansion assembly 24. As the refrigerant flows into the orifice inlet port 22, it flows through the removable filter 86, which traps impurities. The refrigerant then flows through the orifice channel 54, with the variable orifice assembly 56 regulating the refrigerant flow and causing a drop in refrigerant pressure. The refrigerant then flows out through the orifice outlet port 28 on its way to the evaporator 30, where the refrigerant absorbs heat. The refrigerant then travels from the evaporator 30, and through the return inlet port 40, refrigerant return channel 52, and return outlet port 44 on its way back to the compressor 14 to complete the cycle.

Figure 4:
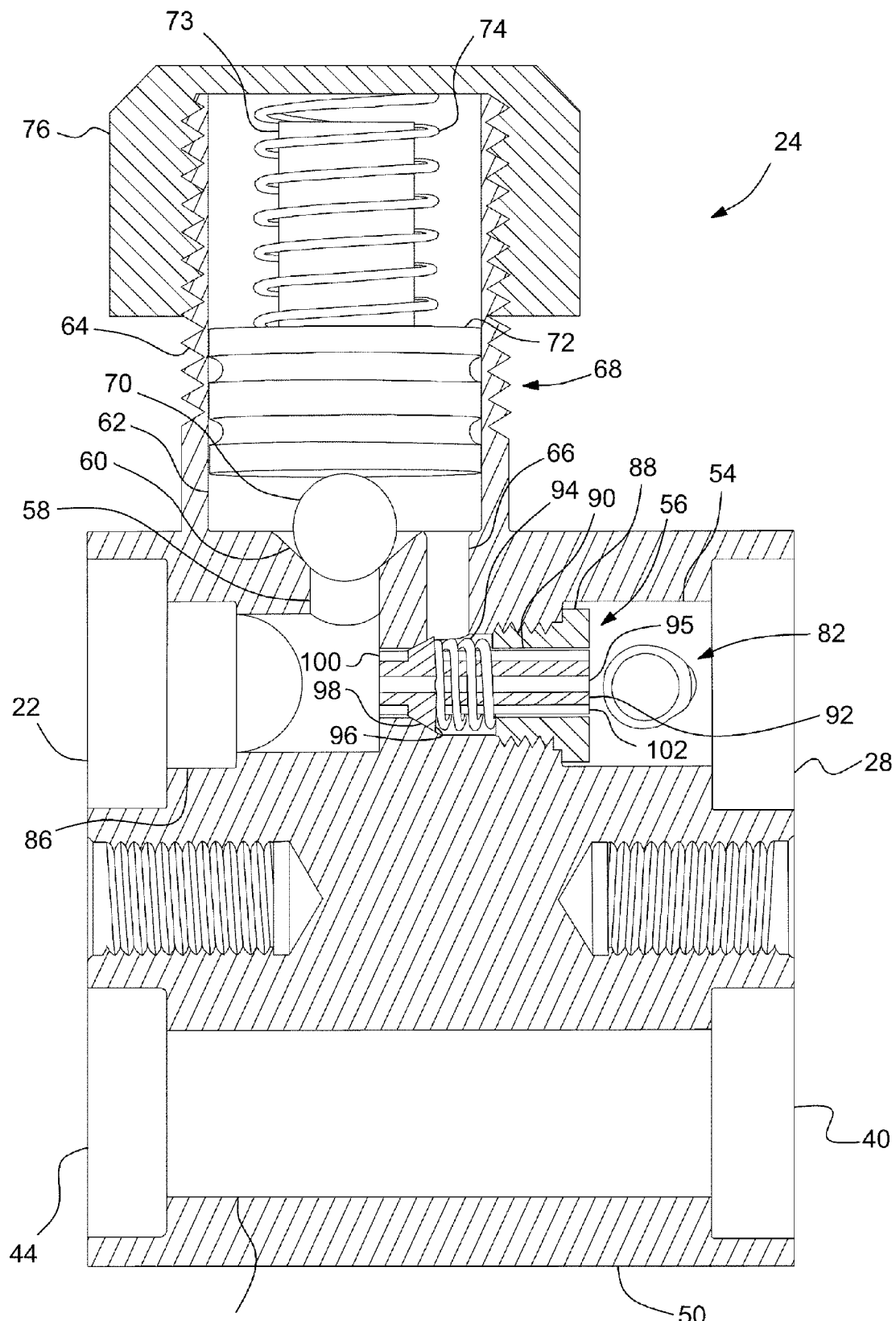
FIG. 4 is a partially sectional view taken along line 4-4 in FIG. 2.

Under operating conditions where the refrigerant just upstream of the variable orifice assembly is operating at pressures below a first predetermined threshold, the variable orifice spring 94 produces enough force to cause the sealing flange 96 of the variable orifice body 92 to stay sealed against the valve seat 98 and the coil spring 74 provides enough force to maintain the check ball 70 sealed against the valve seat 60 (closed positions shown in FIG. 4). All refrigerant, then, is directed only through the fixed orifice opening 95.

However, as this refrigerant pressure exceeds the first predetermined threshold, the variable orifice body 92 will begin to slide axially downstream against the bias of the variable orifice spring 94, moving the sealing flange 96 away from the valve seat 98. This opens the upstream variable orifice passages 100 to the downstream variable orifice passages 102, allowing refrigerant to flow through both the fixed orifice passage 95 and the variable orifice passages 100, 102. The variation in flow depends upon the amount of lift of the sealing flange 96 off of the valve seat 98 (up to the maximum lift). This variation in refrigerant flow, then, allows for improved refrigerant flow control under normal air conditioning system operating conditions.

When operating the vehicle air conditioning system 12 with high pressure refrigerants (such as carbon dioxide), there may be times when the refrigerant pressure is higher than is desirable. The orifice bypass valve 68 and the pressure relief valve 82 provide system protection by relieving the overpressure.

Figure 5:
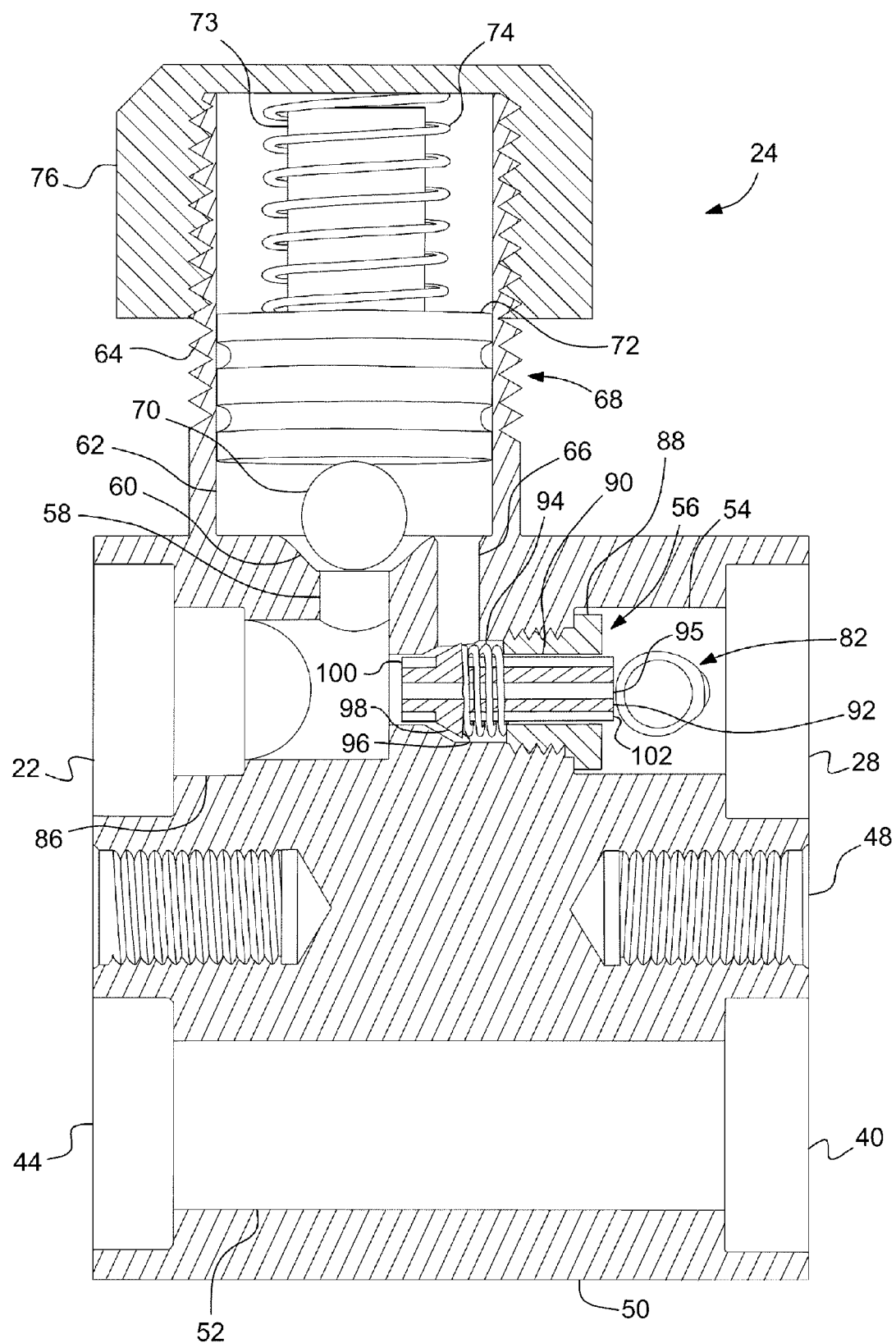
FIG. 5 is view similar to FIG. 4, but showing a variable orifice assembly and an orifice bypass valve in open positions.

When the refrigerant pressure just upstream of the variable orifice assembly 56 exceeds a second predetermined threshold (that is higher than the first threshold), the pressure pushing up on the check ball 70 through the upstream bypass channel 58 will overcome the bias of the coil spring 74, pushing the bypass piston 72 upward and lifting the check ball 70 off of the valve seat 60 into an open position (shown in FIG. 5). The stem 73 extending upward on the bypass piston 72 can contact the spring retention nut 76 to limit the upward travel of the bypass piston 72. With the check ball 70 lifted from the valve seat 60, the refrigerant will flow through the upstream bypass channel 58, bypass chamber 62 and downstream bypass channel 66, bypassing the variable orifice assembly 56 and thus relieving some of the pressure. Of course, since the variable orifice assembly 56 varies on a much smaller pressure differential than the orifice bypass valve 68, the variable orifice assembly 56 will be fully open (as shown in FIG. 5) when the refrigerant pressure is at this second pressure threshold.

When the refrigerant pressure drops below the second predetermined threshold, the bias of the coil spring 74 will cause the bypass piston 72 to press the check ball 70 into sealing engagement with the valve seat 60, thus forcing all of the refrigerant to again flow through the variable orifice assembly 56 rather than through the orifice bypass valve 68.

When the refrigerant pressure exceeds a third, even higher, predetermined threshold, this is an indication that, even though the orifice bypass valve 68 is allowing for some pressure relief, the refrigerant pressure is too high and may be at a level where damage to the evaporator 30 can occur. The burst disk 84 is sized and shaped so that, when the pressure exceeds this third predetermined threshold, the burst disk 84 cracks open, allowing the overpressure refrigerant to escape through the pressure relief valve to atmosphere.

While certain embodiments of the present invention have been described in detail, those familiar with the art to which this invention relates will recognize various alternative designs and embodiments for practicing the invention as defined by the following claims.

What is claimed is:

1. A refrigerant expansion assembly for use in a vehicle air conditioning system comprising:
    an orifice inlet port configured to receive a refrigerant from a condenser;
    an orifice outlet port configured to send the refrigerant to an evaporator;
    an orifice channel connecting the orifice inlet port to the orifice outlet port and including a valve seat;
    a variable orifice assembly, mounted in the orifice channel, including a variable orifice body axially slidable in the orifice channel in a direction parallel to the orifice channel, the variable orifice body including a sealing flange sealingly engageable with the valve seat, an upstream variable orifice passage extending upstream from the sealing flange, a downstream variable orifice passage extending downstream from the sealing flange and a fixed orifice passage extending axially through the variable orifice body, the variable orifice assembly including an orifice spring configured to bias the sealing flange in a direction parallel to the orifice channel into engagement with the valve seat;
    an upstream bypass channel extending from the orifice channel upstream from the variable orifice assembly and including a ball seat;
    a downstream bypass channel extending from the orifice channel downstream from the valve seat;
    a bypass chamber connecting the upstream bypass channel to the downstream bypass channel;
    a check ball mounted in the bypass chamber and sealingly engageable with the ball seat; and
    a bypass spring operatively engaging the check ball to bias the check ball into sealing engagement with the ball seat.

2. The assembly of claim 1 including a bypass piston, and wherein the bypass spring is a coil spring that operatively engages the bypass piston into contact with the check ball.

3. The assembly of claim 1 including a return inlet port configured to receive the refrigerant from the evaporator, a return outlet port configured to send the refrigerant to a refrigerant compressor, and a refrigerant return channel that extends parallel to the orifice channel and connects the return inlet port to the return outlet port, the refrigerant expansion assembly including a wall that prevents pressure communication between the refrigerant return channel and the orifice channel.

4. The assembly of claim 1 including a pressure relief outlet channel connecting to the orifice channel between the variable orifice assembly and the orifice outlet port, and a burst disk enclosing an end of the pressure relief outlet channel, whereby when a refrigerant pressure adjacent to the pressure relief outlet channel exceeds a predetermined pressure threshold, the burst disk will burst, allowing the refrigerant to escape to atmosphere.

5. The assembly of claim 1 including a refrigerant filter removably mounted in the orifice channel adjacent to the orifice inlet port and configured to be removable through the orifice inlet port.

6. The assembly of claim 1 wherein the variable orifice assembly includes a spring retention nut fixed relative to the orifice channel and including a bore within which the variable orifice body is slidable, and wherein the orifice spring is compressed between the spring retention nut and the sealing flange, the downstream orifice passage extending through at least a portion of the spring retention nut.

7. A refrigerant expansion assembly for use in a vehicle air conditioning system comprising:

an orifice inlet port configured to receive a refrigerant from a condenser;

an orifice outlet port configured to send the refrigerant to an evaporator;

an orifice channel connecting the orifice inlet port to the orifice outlet port and including a valve seat;

a variable orifice assembly, mounted in the orifice channel, including a variable orifice body axially slidable in the orifice channel in a direction parallel to the orifice channel, the variable orifice body including a sealing flange sealingly engageable with the valve seat, an upstream variable orifice passage extending upstream from the sealing flange, a downstream variable orifice passage extending downstream from the sealing flange and a fixed orifice passage extending axially through the variable orifice body, the variable orifice assembly including an orifice spring configured to bias the sealing flange in a direction parallel to the orifice channel into engagement with the valve seat; and a pressure relief outlet channel connecting to the orifice channel between the variable orifice assembly and the orifice outlet port, and a burst disk enclosing an end of the pressure relief outlet channel, whereby when a refrigerant pressure adjacent to the pressure relief outlet channel exceeds a predetermined pressure threshold, the burst disk will burst, allowing the refrigerant to escape to atmosphere.

8. The assembly of claim 7 including a refrigerant filter removably mounted in the orifice channel adjacent to the orifice inlet port and configured to be removable through the orifice inlet port.

9. The assembly of claim 8 further comprising:

an upstream bypass channel extending from the orifice channel upstream from the variable orifice assembly and including a ball seat;

a downstream bypass channel extending from the orifice channel downstream from the valve seat;

a bypass chamber connecting the upstream bypass channel to the downstream bypass channel;

a check ball mounted in the bypass chamber and sealingly engageable with the ball seat; and a bypass spring operatively engaging the check ball to bias the check ball into sealing engagement with the ball seat.

10. The assembly of claim 9 including a bypass piston, and wherein the bypass spring is a coil spring that operatively engages the bypass piston into contact with the check ball.

11. The assembly of claim 7 including a return inlet port configured to receive the refrigerant from the evaporator, a return outlet port configured to send the refrigerant to a refrigerant compressor, and a refrigerant return channel that extends parallel to the orifice channel and connects the return inlet port to the return outlet port, the refrigerant expansion assembly including a wall that prevents pressure communication between the refrigerant return channel and the orifice channel.

12. The assembly of claim 7 wherein the variable orifice assembly includes a spring retention nut fixed relative to the orifice channel and including a bore within which the variable orifice body is slidable, and wherein the orifice spring is compressed between the spring retention nut and the sealing flange, the downstream orifice passage extending through at least a portion of the spring retention nut.

13. A method of operating a vehicle air conditioning system having a refrigerant expansion assembly, the method comprising the steps of:

(a) directing a refrigerant through an orifice inlet port, an orifice channel, having a fixed orifice passage through a variable orifice assembly, and an orifice outlet port prior to directing the refrigerant into an evaporator;

(b) applying a refrigerant pressure upstream of the variable orifice assembly to a check ball, against a bias of a bypass spring, and a variable orifice body of the variable orifice assembly, against a bias of an orifice spring;

(c) pushing the variable orifice body in a direction parallel to the orifice channel against the bias of the orifice spring into an open position when the refrigerant pressure exceeds a first predetermined pressure threshold, allowing the refrigerant to flow through an upstream variable orifice passage and a downstream variable orifice passage in the variable orifice assembly;

(d) pushing the check ball against the bias of the bypass spring into an open position when the refrigerant pressure exceeds a second predetermined pressure threshold that is a higher pressure than the first predetermined pressure threshold, allowing at least a portion of the refrigerant to flow past the check ball through a bypass chamber to thereby bypass the upstream variable orifice passage and the fixed orifice passage;

(e) the bypass spring biasing the check ball into a closed position when the refrigerant pressure drops below the second predetermined pressure threshold, thereby forcing all of the refrigerant to flow through the variable orifice assembly; and (f) the orifice spring biasing the variable orifice body into a closed position when the refrigerant pressure drops below the first predetermined pressure threshold, thereby forcing all of the refrigerant to flow through the fixed orifice passage.

14. The method of claim 13 further comprising the steps of:

(g) providing a removable filter adjacent to the orifice inlet port;

(h) directing all of the refrigerant flowing through the orifice channel through the removable filter;

(i) detecting when the filter is clogged; and (j) removing and replacing the filter when the filter is detected as clogged.

15. The method of claim 13 further comprising the steps of:

(g) applying the refrigerant pressure against a burst disk, downstream of the variable orifice assembly; and (h) bursting the burst disk, allowing the refrigerant to flow to atmosphere, when the refrigerant pressure acting against the burst disk exceeds a third predetermined pressure threshold that is greater than the second predetermined pressure threshold.

16. The method of claim 13 wherein step (d) is further defined by pressing the check ball against a bypass piston to thereby move the bypass piston against the bias of the bypass spring, wherein the bypass spring is a coil spring.

* * * * *